United States Patent
Maerkl

(10) Patent No.: US 8,464,600 B2
(45) Date of Patent: Jun. 18, 2013

(54) DEVICE FOR SHIFTING CHANGES IN THE TRANSMISSION RATIO

(75) Inventor: Johann Maerkl, Ingolstadt (DE)

(73) Assignee: Audi AG, Ingolstadt (DE)

( * ) Notice: Subject to any disclaimer, the term of this patent is extended or adjusted under 35 U.S.C. 154(b) by 1207 days.

(21) Appl. No.: 11/793,216

(22) PCT Filed: Dec. 8, 2005

(86) PCT No.: PCT/EP2005/013161
§ 371 (c)(1),
(2), (4) Date: Jun. 18, 2007

(87) PCT Pub. No.: WO2006/066738
PCT Pub. Date: Jun. 29, 2006

(65) Prior Publication Data
US 2008/0092686 A1    Apr. 24, 2008

(30) Foreign Application Priority Data
Dec. 17, 2004  (DE) .......................... 10 2004 060 771

(51) Int. Cl.
*B60K 17/04*   (2006.01)
*F16H 59/04*   (2006.01)
*H01L 43/00*   (2006.01)
*G01B 7/14*    (2006.01)

(52) U.S. Cl.
USPC .................... 74/473.12; 74/473.3; 74/473.36; 338/32 R; 324/207.24

(58) Field of Classification Search
USPC ................. 74/473.1, 473.12, 473.36, 473.37, 74/473.3, 335; 335/207; 73/514.38; 338/32 R; 324/207.24, 207.26
See application file for complete search history.

(56) References Cited

U.S. PATENT DOCUMENTS

| | | | | |
|---|---|---|---|---|
| 1,156,272 A | * | 10/1915 | Cass | 74/524 |
| 3,192,793 A | * | 7/1965 | Hurst, Jr. et al. | 74/473.3 |
| 4,022,078 A | * | 5/1977 | Malott | 74/473.3 |
| 4,471,304 A | | 9/1984 | Wolf | |
| 4,660,430 A | * | 4/1987 | Bortfeld et al. | 74/335 |
| 4,733,214 A | * | 3/1988 | Andresen | 338/128 |
| 4,766,774 A | * | 8/1988 | Tamai | 74/473.12 |
| 4,793,202 A | * | 12/1988 | Okubo | 74/473.37 |
| 5,038,627 A | * | 8/1991 | Schwaiger et al. | 74/335 |
| 5,160,918 A | * | 11/1992 | Saposnik et al. | 345/161 |
| 5,243,871 A | * | 9/1993 | Weiten | 74/473.12 |
| 5,370,015 A | * | 12/1994 | Moscatelli | 74/335 |
| 5,406,860 A | * | 4/1995 | Easton et al. | 74/335 |
| 5,450,054 A | * | 9/1995 | Schmersal | 338/128 |

(Continued)

FOREIGN PATENT DOCUMENTS
DE         42 08 888 A1    9/1993
DE         197 48 115 C2   5/1999

(Continued)

*Primary Examiner* — Richard W Ridley
*Assistant Examiner* — Adam D Rogers
(74) *Attorney, Agent, or Firm* — Novak Druce Connolly Bove + Quigg LLP

(57) ABSTRACT

The invention relates to a device for shifting changes in the transmission ratio of a vehicle transmission. The device comprises at least one axially movable and/or rotabale shifting element and an electrical position identification of the shifting element. At least one magnet which generates position signals in combination with a stationary sensor is disposed on the shifting element. In order to create a device that is advantageous regarding production and design, the magnet is formed directly by a magnetic area on the shifting element.

4 Claims, 2 Drawing Sheets

U.S. PATENT DOCUMENTS

| | | | | |
|---|---|---|---|---|
| 5,468,197 A * | 11/1995 | Loeffler | | 477/99 |
| 5,625,289 A * | 4/1997 | Daetz et al. | | 324/207.14 |
| 5,743,143 A * | 4/1998 | Carpenter et al. | | 74/335 |
| 5,852,953 A * | 12/1998 | Ersoy | | 74/473.12 |
| 5,880,544 A * | 3/1999 | Ikeda et al. | | 310/74 |
| 6,057,682 A * | 5/2000 | McCurley et al. | | 324/207.23 |
| 6,144,272 A * | 11/2000 | Satoh et al. | | 335/207 |
| 6,175,290 B1 * | 1/2001 | Forsythe et al. | | 335/207 |
| 6,253,460 B1 * | 7/2001 | Schmitz | | 33/706 |
| 6,382,045 B1 * | 5/2002 | Wheeler | | 74/473.12 |
| 6,530,293 B1 * | 3/2003 | Ruckert et al. | | 74/473.12 |
| 6,550,351 B1 * | 4/2003 | O'Reilly et al. | | 74/335 |
| 6,736,024 B1 * | 5/2004 | Spence et al. | | 74/473.1 |
| 6,759,933 B2 * | 7/2004 | Fallak | | 335/207 |
| 6,823,725 B2 * | 11/2004 | Lohberg | | 73/114.01 |
| 6,851,538 B2 * | 2/2005 | Meyer et al. | | 192/219.4 |
| 6,857,335 B2 * | 2/2005 | Kahara | | 74/473.33 |
| 6,867,680 B1 * | 3/2005 | Kulle | | 338/32 H |
| 7,026,897 B2 * | 4/2006 | Lamb et al. | | 335/205 |
| 7,137,313 B2 * | 11/2006 | Giefer et al. | | 74/473.12 |
| 7,552,659 B2 * | 6/2009 | Komatsu et al. | | 74/335 |
| 2002/0152827 A1 * | 10/2002 | Hayashi et al. | | 74/473.3 |
| 2002/0157492 A1 * | 10/2002 | Hayashi et al. | | 74/336 R |
| 2003/0188594 A1 * | 10/2003 | Levin et al. | | 74/473.12 |
| 2003/0213327 A1 * | 11/2003 | Syamoto | | 74/473.12 |
| 2004/0036467 A1 * | 2/2004 | May et al. | | 324/207.15 |
| 2005/0109145 A1 * | 5/2005 | Levin et al. | | 74/473.12 |

FOREIGN PATENT DOCUMENTS

| | | |
|---|---|---|
| DE | 199 08 036 A1 | 8/2000 |
| GB | 2 096 421 | 4/1981 |
| WO | WO 2005/064281 | 12/2004 |

* cited by examiner

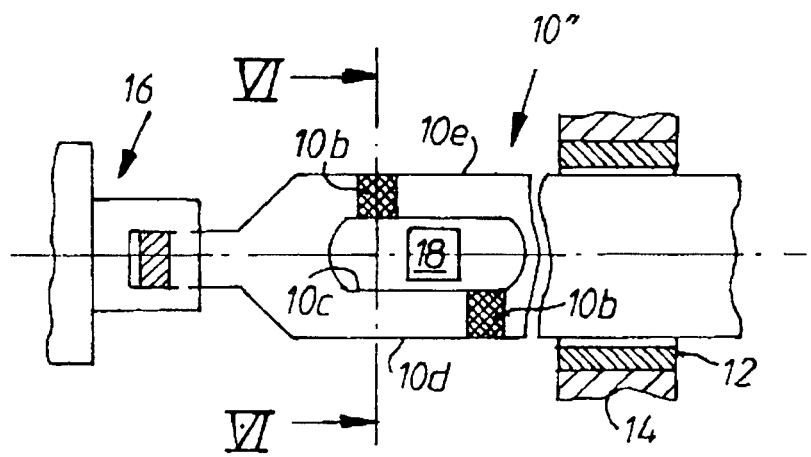
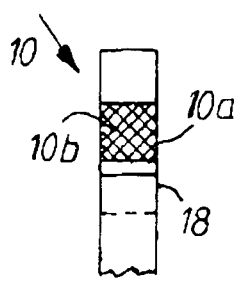
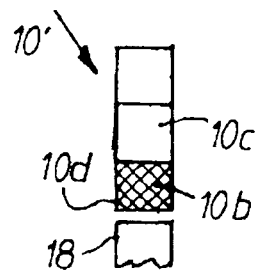
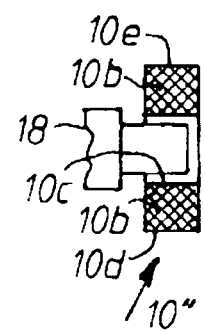

DEVICE FOR SHIFTING CHANGES IN THE TRANSMISSION RATIO

This application is a U.S. National Phase under 35 USC §371 of PCT/EP2005/013161, filed Dec. 8, 2005, which claims priority from DE 120004060771.0, filed Dec. 17, 2004, each of which is hereby incorporated by reference in its entirety.

The invention relates to a device for shifting changes in the transmission ratio in transmissions of motor vehicles.

BACKGROUND OF THE INVENTION

To control the changes in transmission ratios in motor vehicle transmissions, especially in automatic transmissions, it is necessary to sense and electronically process the positions of the individual shifting elements, for example a selector shaft and/or selector rods or rails.

DE 199 08 036 A 1 for example discloses installing on a rotatable and axially movable selector shaft several magnets which with two stationary, electrical coils as sensors generate the corresponding position signals of the selector shaft. In the device according to DE 197 48 115 C2, on the selector shaft there is a ring element which is magnetized on its outer periphery and which interacts with Hall sensors which are located radially on its periphery. In both instances the production effort is increased by the attachment of the magnets and additional installation space is required.

The object of the invention is to propose a device of the generic type which is simpler to produce and more advantageous with respect to the required installation space.

SUMMARY OF THE INVENTION

It is suggested according to the invention that at least one magnet is formed directly by a magnetized region on the shifting element. In this way separate magnets and their installation on the shifting elements can be eliminated, additionally installation space being saved by their integration into the shifting element.

Here it is functionally advantageous if the shifting element in the magnetized region is made such that a magnetic field similar to one or more magnets is produced. Thus one or more position signals can be reliably generated.

The cross section of the shifting element in the magnetized region can be made essentially square.

Furthermore, the rod-shaped shifting element can be made tapered at least in the magnetized region, so that the sensor, for example a Hall sensor or a small coil, can lie within the peripheral region of the other shifting element to the advantage of the installation space.

The tapering can be produced preferably according to structural circumstances by unilateral or bilateral recesses on the shifting element.

Alternatively, at least in the magnetized region of the shifting element a slot-like recess can be provided therein, by means of which a preferred cross section of the magnetized region or regions of the shifting element can be easily ensured.

Thus, of the legs of the shifting element which are formed on either side of the recess, one leg can be magnetized to which the stationary sensor is adjacent, or the legs of the shifting element which are formed on either side of the recess can be magnetized, then the stationary sensor being able to project into the recess in a structurally especially favorable manner.

In terms of production technology, the shifting element can be made especially easily as an axially movable selector rail with an essentially rectangular cross section. In this connection, to further reduce the production cost, the recesses and/or tapers provided at least in the magnetized region on the selector rail can be produced by punching.

BRIEF DESCRIPTION OF THE DRAWINGS

FIG. 2 shows a cross section along line Ii-II of FIG. 1 through the selector rail;

FIG. 4 shows a cross section along line IV-IV of FIG. 3 through the selector rail;

FIG. 5 shows another alternative selector rail according to FIG. 1 with a slot-shaped recess and two magnetizable regions; and FIG. 6 shows a cross section according to line VI-VI of FIG. 5 through the selector rail.

DETAILED DESCRIPTION OF THE PREFERRED EMBODIMENTS OF THE INVENTION

Figure 1:
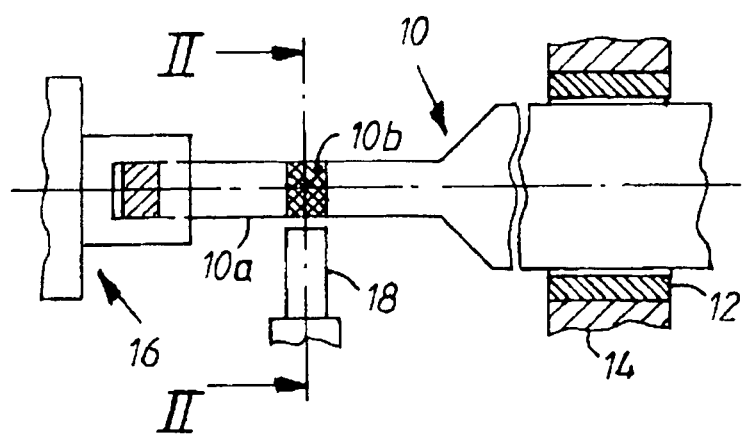
FIG. 1 shows a partially visible selector rail of a transmission for motor vehicles in a side view, with tapering in the magnetized region.

FIGS. 1 and 2 show an only partially illustrated shifting element or selector rail 10 which is supported to be able to move axially in a bearing arrangement 12 which is not detailed in the housing wall 14 of a motor vehicle transmission. The selector rail 10 on it one end is connected to for example an electromagnetically working actuator 16 and can thus be pushed out of a middle position into two positions on the drawings to the left and right along a rectilinear line of travel, and in a manner which is not shown changes in the transmission ratio or gears can be selected via a selector fork and synchronous clutch connected to the selector rail 10. In the transmission several selector rails 10 of the illustrated type can be mounted and actuated by means of actuators 16.

The actuator 16 is triggered in the conventional manner via an electronic automatic transmission control which is also connected to one or more stationary sensors 18 for position detection of the selector rail 10. The sensors 18 are Hall sensors or small coils of known design which in interaction with one or more magnetic fields on the selector rail 10 generate position signals which are evaluated accordingly in the electronic automatic transmission control device which is not shown.

The selector rail 10 is made rectangular in cross section and in the region of the position sensor 18 is provided with a tapered section 10a such that this section 10a has a more or less square cross section (compare FIG. 2).

In the region of the sensor 18 which, as is to be seen, projects into the peripheral region of the selector rail 10 tightly against the tapered section 10a, a magnetized region 10b (shown cross-hatched) is formed which produces a magnetic field similar to a permanent magnet for triggering the sensor 18. Thus the Hall sensor 18 in the position of the selector rail 10 shown in FIG. 1 can deliver a position signal for a neutral position or gear position of the selector rail 10. Conversely there can optionally also be several magnetized regions 10b spaced apart from one another.

Figure 3:
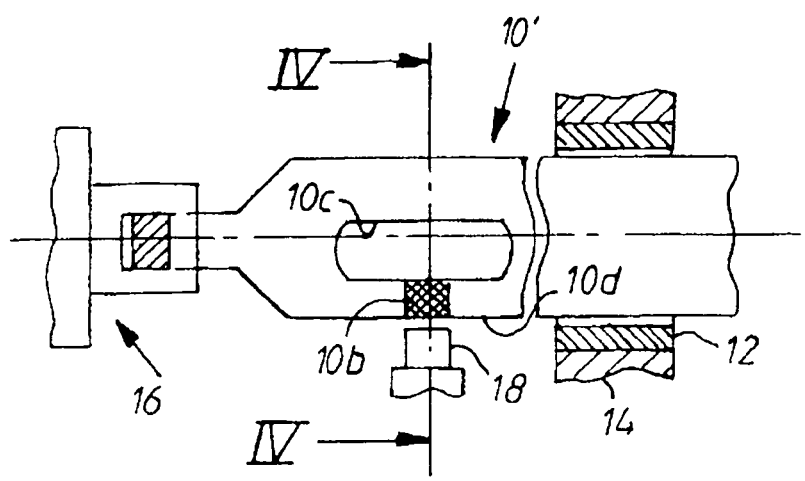
FIG. 3 shows another selector rail according to FIG. 1, but with a slot-shaped recess in the magnetized region.

FIGS. 3 and 4 show an alternative selector rail 10' which is described only to the extent that it differs significantly from the selector rail 10 as shown in FIGS. 1 and 2. The same parts are provided with the same reference numbers:

Instead of a tapered section 10a, the selector rail 10' is provided with a slot-shaped recess 10c which lies outside the center axis of the selector rail 10'. On the lower leg 10d of the selector rail 10', which leg borders the recess 10c and which in turn is chosen to be more or less square in cross section (cf. FIG. 4), the magnetized region 10b is formed and as described above interacts with the sensor 18. The arrangement of the sensor 18 here lies outside the peripheral region of the selector rail 10', as is apparent.

FIGS. 5 and 6 show another alternative selector rail 10" which in turn is only described to the extent it differs significantly from the selector rail 10 as shown in FIGS. 1 and 2. The same parts are provided with the same reference numbers.

The selector rail 10" has a slot-like recess 10c which lies symmetrically in the center axis along the line of the selector rail 10" and into which the stationary sensor 18 projects laterally in a divergent arrangement (cf. FIG. 6.)

The legs 10d and 10e which border the recess 10c and which are made with the same thickness and more or less square in cross section are provided with one magnetized region 10b each, which lie axially offset to one another and which both interact with the sensor 18 and generate a position signal for the respective overlapping with the sensor 18.

The described steel selector rails 10 can be produced in a punching process, also the tapered section 10a or the recesses 10c being punched accordingly at the same time.

The invention is not limited to the illustrated embodiment. Instead of a selector rail 10 as the shifting element, an axially movable selector rod and/or a selector shaft which can move translationally and rotationally (for example for gear selection and gear shifting) can also be used as the shifting element of a transmission.

The invention claimed is:

1. A device for detecting a shifting of the transmission ratio of a transmission of a motor vehicle, comprising:
    a first member supportable on said transmission, mechanically connectable to a shifting component of said transmission, displaceable along a rectilinear line of travel, having a slot disposed along said rectilinear line of travel providing a pair of spaced segments; wherein one of said pair of spaced segments includes at least one magnetized region providing a magnetic field; and
    a second member fixedly supported on a housing of said transmission and having a portion thereof projecting into said slot of said first member subjected to said magnetic field when said at least one magnetized region is displaced along said rectilinear line of travel within an excitation proximity of said projecting portion.

2. The device according to claim 1 including a pair of said magnetized regions disposed on at least one of said pair of spaced segments of said first member, and on opposite sides of said projecting portion of said second member.

3. The device according to claim 2 wherein one of said pair of said magnetized regions is disposed on one of said pair of spaced segments of said first member and the other of said pair of magnetized regions is disposed on the other of said pair of spaced segments.

4. The device according to claim 1 wherein said second member comprises an electrical coil functional to react with said magnetic field when within the excitation proximity therewith to generate a signal indicating a position of said first member.

\* \* \* \* \*